(12) United States Patent
Gati

(10) Patent No.: US 6,986,626 B2
(45) Date of Patent: Jan. 17, 2006

(54) CUTTING INSERT FOR GROOVING OPERATIONS

(75) Inventor: Uzi Gati, Karmiel (IL)

(73) Assignee: Iscar, Ltd., Tefen (IL)

( * ) Notice: Subject to any disclaimer, the term of this patent is extended or adjusted under 35 U.S.C. 154(b) by 60 days.

(21) Appl. No.: 10/781,821

(22) Filed: Feb. 20, 2004

(65) Prior Publication Data

US 2004/0170481 A1 Sep. 2, 2004

(30) Foreign Application Priority Data

Feb. 27, 2003 (IL) .................................. 154649

(51) Int. Cl.
*B23B 27/16* (2006.01)

(52) U.S. Cl. ........................................ 407/113; 407/117
(58) Field of Classification Search ................ 407/117, 407/113, 114; 82/101

See application file for complete search history.

(56) References Cited

U.S. PATENT DOCUMENTS

| 4,936,719 | A | * | 6/1990 | Peters .......................... 407/42 |
| 5,772,365 | A | * | 6/1998 | Vogel et al. .................. 407/42 |
| 6,447,219 | B1 | | 9/2002 | Tagtstrom et al. |
| 6,742,971 | B2 | * | 6/2004 | Tong ........................... 407/117 |
| 6,769,843 | B2 | * | 8/2004 | Hansson ...................... 407/91 |
| 2002/0159846 | A1 | * | 10/2002 | Horiike et al. .............. 407/114 |

* cited by examiner

*Primary Examiner*—Derris H. Banks
*Assistant Examiner*—Sara Addisu
(74) *Attorney, Agent, or Firm*—Womble Carlyle

(57) ABSTRACT

A grooving insert has a forward main cutting edge and two opposing side cutting edges extending rearwardly from the main cutting edge on opposing sides of a center line of the grooving insert. Each side cutting edge has a serrated form in a top view of the grooving insert.

18 Claims, 4 Drawing Sheets

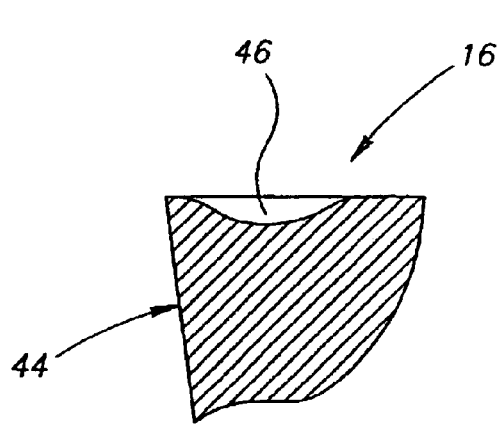 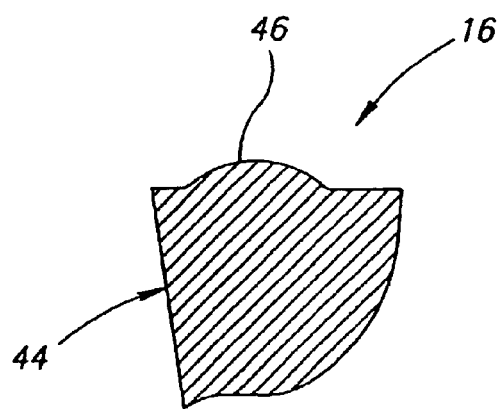
FIG.6A  FIG.6B
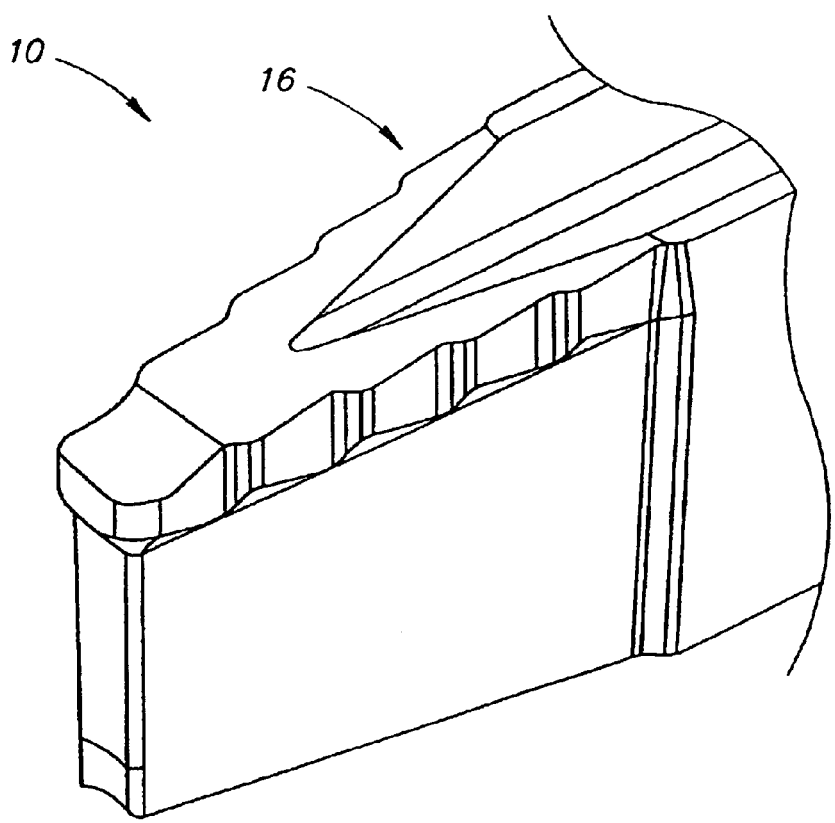
FIG.7

CUTTING INSERT FOR GROOVING OPERATIONS

FIELD OF THE INVENTION

The present invention relates to a cutting insert for grooving operations. In particular, the cutting insert in accordance with the present invention is intended primarily for the production of keystone shaped grooves, finding application in the machining of ring grooves in pistons.

BACKGROUND OF THE INVENTION

Such a cutting insert is known, for example, from U.S. Pat. No. 6,447,219 which discloses a cutting insert comprising a rear shank portion and a forward cutting head projecting forwardly from the rear shank portion. The cutting head includes a top side, an underside, two flank side surfaces each interconnecting the top side with the underside, and a forwardly facing front flank surface interconnecting the flank side surfaces. Each flank side surface forms an acute angle with the top side. A transition between the flank front surface and the top side forms a main cutting edge. A transition between each flank side surface and the top side forms a side cutting edge. The side cutting edges extend on respective opposite sides of a center line of the cutting head and converge in a forward direction. The side cutting edges form an acute angle between one another. Each side cutting edge includes a plurality of spaced-apart grooves formed therein, whereby each side cutting edge is non-continuous. Therefore, the cutting edge comprises cutting edge segments, each segment separated from an adjacent one by a groove.

During a grooving operation, first the main cutting edge engages the workpiece. As the cutting depth increases, the interaction between the insert and the workpiece occurs on three different sides, i.e. along the major cutting edge and the two side cutting edges at which point the grooves begin to play an active role and contribute to reducing the width of the chips. This helps to avoid the formation of chips which are too thin and difficult to handle. However, consecutive cutting edge segments do not overlap in a direction perpendicular to the direction of feed (i.e., perpendicular to the center line). Consequently, as the cutting depth increases, after a given cutting edge segment has completed machining the workpiece, a portion of the workpiece will engage the groove that is located immediately to the rear (i.e., downstream relative to the feed direction) of the given cutting edge segment. This will result in large forces of resistance being applied to the cutting insert, each time a further groove engages the workpiece. The grooves are not cutting edges and therefore as the cutting depth increases those parts of the workpiece engaging the grooves will not be cut, but at the best deformed. The whole machining process will therefore be very inefficient.

SUMMARY OF THE INVENTION

In accordance with the present invention there is provided a grooving insert comprising a clamping portion and at least one cutting portion, top and bottom opposing surfaces and a peripheral side surface extending therebetween, the top and peripheral side surfaces meeting at an upper edge at least a portion of which comprises a cutting edge, the at least one cutting portion comprising a forward main cutting edge and two opposing side cutting edges extending rearwardly from the main cutting edge towards the clamping portion on opposing sides of a center line of the grooving insert, wherein each side cutting edge has a serrated form in a top view of the grooving insert.

Preferably, the serrated form comprises a plurality of steps, each step comprising three sections, a forward section, a rear section and a corner section therebetween, the rear section of one step merging with the forward section of an adjacent step and the forward main cutting edge merging with a first step of the plurality of steps.

Generally, the steps of one side cutting edge are lined up with the steps of the other side cutting edge so that the upper edge has mirror symmetry about a plane passing through the center line, with the steps of the opposing two side cutting edges forming pairs of opposing steps relative to the center line.

If desired, the forward section of the first step is rounded.

Typically, the rounded forward section is a circular arc having a given radius.

In accordance with a preferred embodiment of the present invention, the corner sections of one of the opposing side cutting edges lies on a first line and the corner sections of the other one of the opposing side cutting edges lie on a second line.

Preferably, the first and second lines converge forwardly to the forward sections of the first step on either side of the main cutting edge.

In accordance with a preferred embodiment of the present invention, the forward section of each step of a given pair of opposing steps, apart from the first step, lies on a line of a pair of opposing lines that converge forwardly.

Further in accordance with a preferred embodiment of the present invention, the rear section of each step of a given pair of opposing steps lie on a line of a pair of opposing lines that converge rearwardly.

Typically, the peripheral side surface comprises at least one end surface and two opposing side surfaces extending rearwardly from the at least one end surface, the at least one end surface meeting the top surface at the main cutting edge of the at least one cutting portion.

If desired, each side surface is divided into two side surface portions, an upper side surface portion adjacent the upper edge and a lower side surface portion extending from the upper side surface portion to the bottom surface.

Typically, the shape of the upper side surface portion is similar to the shape of the upper edge in a top view of the grooving insert.

BRIEF DESCRIPTION OF THE DRAWINGS

For a better understanding of the present invention and to show how the same may be carried out in practice, reference will now be made to the accompanying drawings, in which:

FIG. 6A is a cross section taken along the lines VI—VI in FIG. 2;

FIG. 6B is a cross section taken along the lines VI—VI in FIG. 2; and

FIG. 7 is a perspective view of another grooving insert according to the present invention.

DETAILED DESCRIPTION

Figure 1:
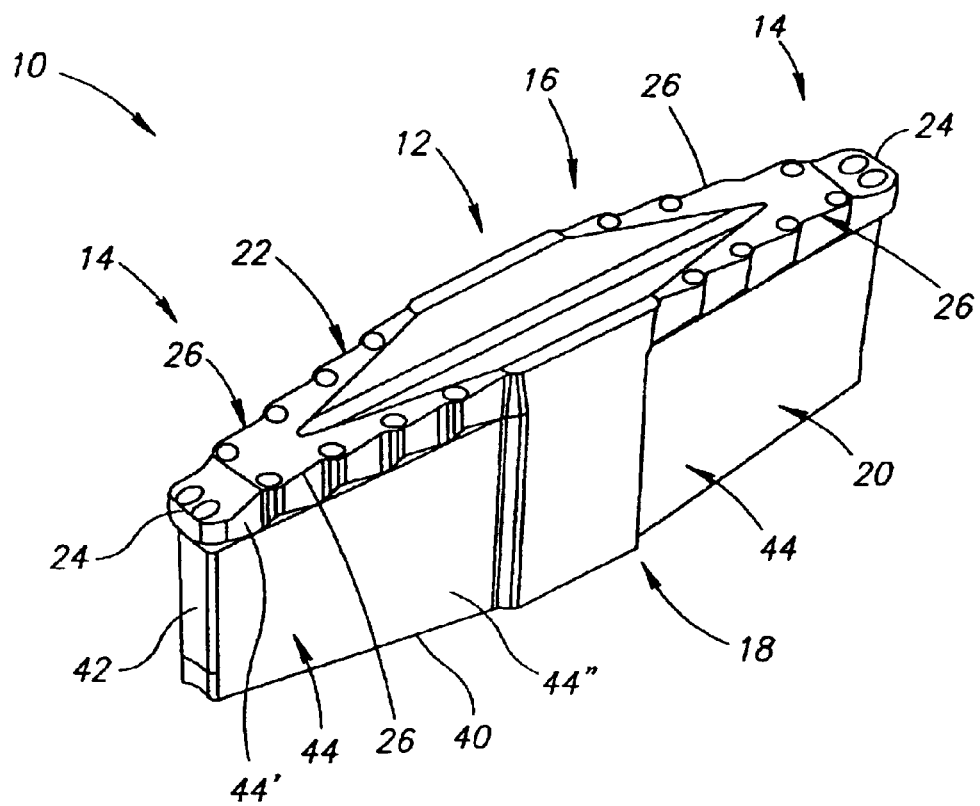
FIG. 1 is a perspective view of a grooving insert according to the present invention.

Attention is drawn to the drawings showing a cutting insert 10 for grooving operations in accordance with the present invention. The grooving insert 10 is typically made of extremely hard and wear-resistant material such as cemented carbide, either by form-pressing or by injection molding and sintering carbide powders in a binder. The grooving insert 10 is an indexable double-ended grooving insert and comprises a clamping portion 12 and two cutting portions 14. However, the invention is equally applicable to single ended grooving inserts, having only one cutting portion 14. The grooving insert 10 has top and bottom opposing surfaces 16, 18 and a peripheral side surface 20 extending therebetween, the top and peripheral side surfaces 16, 20 meeting at an upper edge 22 comprising a forward main cutting edge 24 and two opposing identical side cutting edges 26 extending rearwardly from the main cutting edge 24 to the clamping portion 12 on opposing sides of a center line L of the grooving insert 10. In accordance with the present invention, each side cutting edge 26 has a generally serrated form in a top view of the grooving insert 10.

Figure 2:
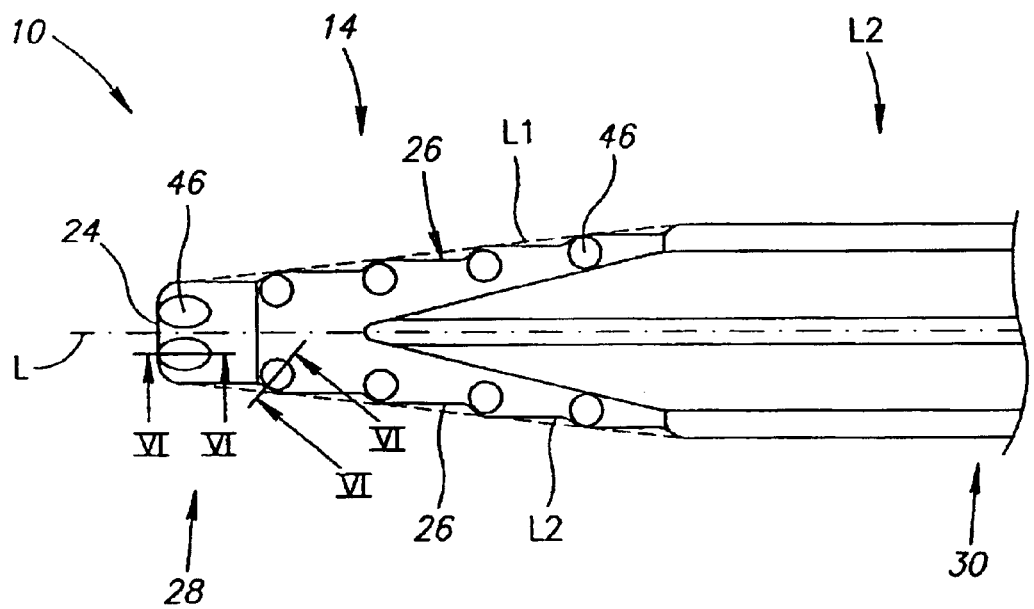
FIG. 2 is a partial top view of the grooving insert shown in FIG. 1.
Figure 3:
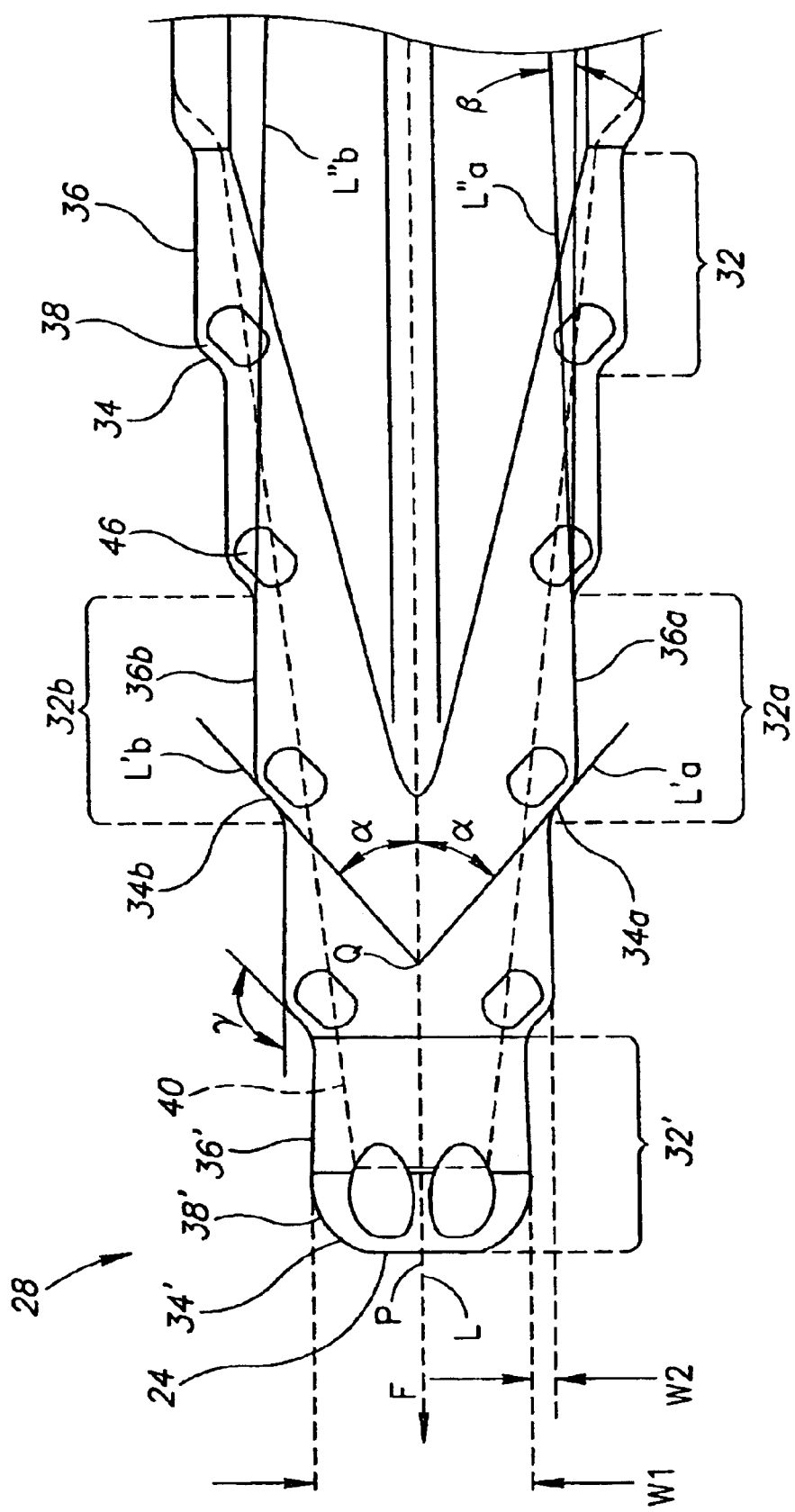
FIG. 3 is the same view as in FIG. 2 to a larger scale.

In accordance with a preferred embodiment of the present invention, the two cutting portions 14 are identical and therefore it is sufficient to describe the double-ended grooving insert 10 with respect to half the grooving insert 10 as shown in FIGS. 2 and 3. The line L defines a forward to rear longitudinal direction of the grooving insert 10, with the main cutting edge 24 being located at the forward end 28 of the grooving insert 10 and the clamping portion 12 being located at the rear end 30 with respect to one half of the grooving insert 10, as shown in FIGS. 2 and 3.

With reference to FIG. 3, each side cutting edge 26 comprises a plurality of steps 32, each step 32 comprising three sections 34, 36, 38, a forward section 34, a rear section 36 and a corner section 38 located between the forward and rear sections 34, 36. The rear section 36 of one step 32 merges with the forward section 34 of an adjacent step 32 and the forward main cutting edge 24 merges with a first step 32' of the plurality of steps. In the embodiment shown in the figures, the forward section 34' of the first step 32' is rounded and merges with the corner section 38' forming a joint rounded forward section 34' that merges directly with the rear section 36'. Typically, the rounded forward section 34' is a circular arc of a given radius. The steps 32 of one side cutting edge 26 are lined up with the steps 32 of the other side cutting edge 26 so that the upper edge 22 has mirror symmetry about a plane P passing through the center line L, with the steps 32 of the opposing two side cutting edges 26 forming pairs of opposing steps relative to the center line L. An illustrative pair of opposing steps 32a, 32b is shown in FIG. 3. The forward sections 34a, 34b of the steps of the illustrative pair of opposing steps 32a, 32b lie on a pair of opposing lines L'a, L'b that converge forwardly from the forward sections 34a, 34b to a forward point of intersection Q on the center line. The forward point of intersection Q being located forward to the forward sections 34a, 34b of the illustrative pair of opposing steps 32a, 32b. Similarly, all the forward sections of all the pairs of opposing steps lie on pairs of opposing lines that converge forwardly from the forward sections to forward points of intersection on the center line. And, as seen in the figures, no two forward sections lie on the same line, in a top view of the grooving insert.

Furthermore, the rear sections 36a, 36b of the steps of the illustrative pair of opposing steps 32a, 32b lie on a pair of opposing lines L"a, L"b that converge rearwardly from the rear sections 36a, 36b to a rear point R of intersection on the center line. The rear point of intersection cannot be shown since it intersects the center line at a point off FIG. 3. The rear point of intersection R is located rearward to the rear sections 36a, 36b of the illustrative pair of opposing steps 32a, 32b. Similarly, all the rear sections of all the pairs of opposing steps lie on pairs of opposing lines that converge rearwardly from the rear sections to rear points of intersection on the center line.

The structure of the serrated form of the side cutting edges 26 described above provides the side cutting edges 26 with the following properties. First, the forward sections 34 are oriented at an acute angle $\alpha$ to the direction of feed F. Second, the rear sections 36 are relieved from the direction of feed F by an acute angle $\beta$. Third, the forward and rear sections 34, 36 are inclined to each other by an obtuse angle $\gamma$. These properties endow the grooving insert 10 with a number of advantageous characteristics. First, the corner sections 38 (or, "cutting corners") are strengthened. Second, at the main cutting edge 24 a central chip will be formed and at each forward section 34 (or, "minor operative cutting edges") a small separate side chip will be formed that will be directed away from the sidewalls of the groove formed in the workpiece. Third, there is complete overlap between the forward sections 34 of each side cutting edge 26 in the direction of feed F, so that the workpiece only encounters cutting edges (the main cutting edge 24 and the "minor operative cutting edges" 34).

Also shown in FIG. 3 is a bottom edge 40 (shown as a dashed hidden line) of the grooving insert 10 at which the peripheral side surface 20 meets the bottom surface 18. As can be seen, in a top view of the grooving insert 10, the bottom edge 40 is located within the bounds of the upper edge 22 indicating that the peripheral side surface 20 extends downwardly and inwardly from the side cutting edge 26 to the bottom edge 40, ensuring that the cutting edge 26 is relieved from the workpiece during grooving operations. The peripheral side surface 26 comprises an end surface 42 and two opposing side surfaces 44 extending rearwardly from the end surface 42. The end surface 42 meets the top surface 16 at the main cutting edge 24 and the side surfaces 44 meet the top surface 16 at the side cutting edges 26. Each side surface 44 is divided into two side surface portions, an upper side surface portion 44' adjacent the upper edge 22 and a lower side surface portion 44" extending from the upper side surface portion 44' to the bottom surface 18. The shape of the upper side surface portion 44' is similar to the shape of the upper edge 22 in a top view of the grooving insert 10.

Figure 5:
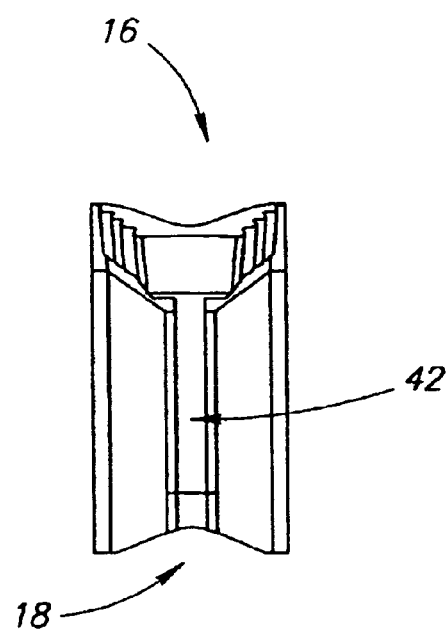
FIG. 5 is an end view of the grooving insert shown in FIG. 1.

Attention is now drawn to FIGS. 1 and 5. The top surface 16 in the vicinity of the clamping portion 12 and the bottom surface have concave V-shaped surfaces extending in the longitudinal direction. The clamping surfaces of an insert pocket of a tool holder (not shown) for retaining the grooving insert 10 will have mating longitudinally extending convex V-shaped surfaces. This arrangement is well known in the art for achieving lateral stability of the grooving insert during machining operations.

FIGS. 1 to 3 show chip formers 46 adjacent the main cutting edge 24 and adjacent each forward section 34 of the side cutting edge 26. The chip formers 46 can be of any desired form. FIGS. 6A and 6B show two illustrative examples of chip formers. In FIG. 6A the chip formers 46 are recesses in the top surface 16, whereas in FIG. 6B the chip formers 46 are protrusions protruding from the top surface 16. FIG. 7 shows a grooving insert 10 in accordance with the present invention without chip formers in the top surface 16.

Reverting to FIG. 2, it is seen that the corner sections 38 of one of the side cutting edges 26 lie on a first line L1 and the corner sections of the other side cutting edge 26 lies on a second line L2. The first and second lines L1, L2 converge forwardly to the forward sections 34' of the first step 32' on either side of the main cutting edge 24. Although the shape of a groove formed in a workpiece will be that of the side cutting edges 26 and the main cutting edge 24, it can be seen by from the shape formed by the first and second lines L1, L2 and the main cutting edge 24 that the shape of the groove is approximately keystone or wedge-like shape in cross section. Ring grooves having a keystone or wedge-like shape in cross section are required, e.g., in pistons. Since, such a shape cannot be directly grooved in a surface, the grooving insert 10 of the present invention enables the machining of a ring groove in a piston having an approximate keystone shape in cross section. Hence, the grooving insert 10 in accordance with the present invention can be used for roughing a groove in a workpiece, the final product being obtained in a finishing process. The degree of smoothness of the grooved surface depends primarily on the length of the forward sections 34 and on the obtuse angle γ between the forward and rear sections 34, 36 of the side cutting edges 26. In general, the width W1 of the groove formed by the main cutting edge 24 together with the adjacent rounded forward sections 34' of the first step 32' will be much wider than the width of cut W2 made by any given forward section 34. In one specific non-binding example W1 is 5 to 10 times larger than W2. However, the relative sizes of W1 and W2 are dependent on the application. In absolute terms, W2 will generally not be smaller that one twentieth of a millimeter and typically would be between 0.05 mm to 0.5 mm.

Figure 4:
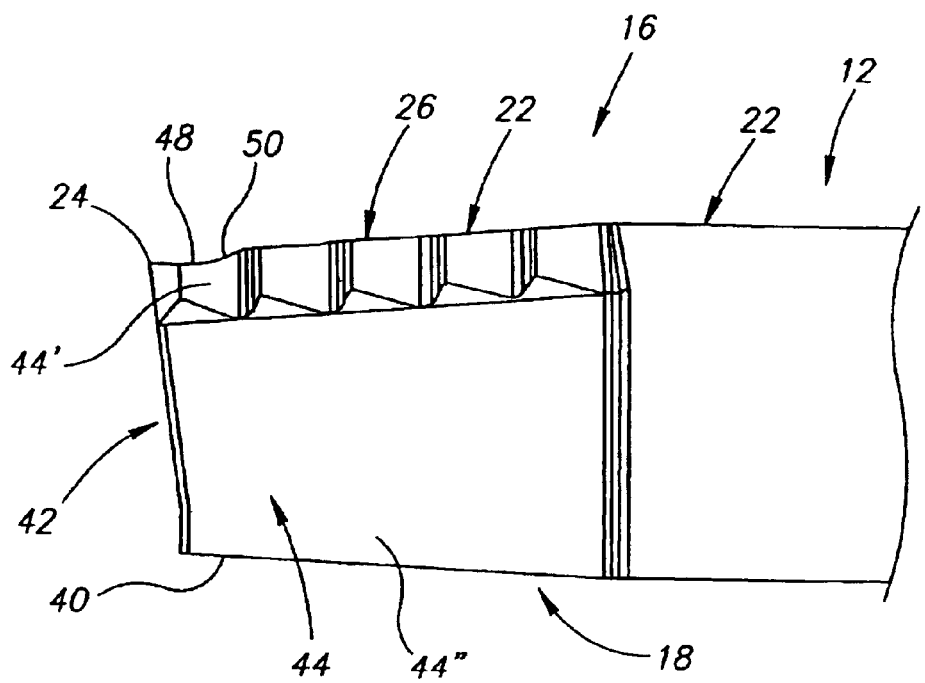
FIG. 4 is a partial side view of the grooving insert shown in FIG. 1.

It will be noted in FIG. 4 that a rake surface 48 adjacent the main cutting edge 24 is curved, extending rearwardly and downwardly from the main cutting edge 24 and then upwardly to a rear deflecting wall 50, which assists in curling the chip formed at the main cutting edge 24 so that it will not interfere with the chips formed at the forward sections 34 of the side cutting edges 26.

Although the present invention has been described to a certain degree of particularity, it should be understood that various alterations and modifications could be made without departing from the scope of the invention as hereinafter claimed.

What is claimed is:

1. A grooving insert comprising:
  a clamping portion and at least one cutting portion;
  top and bottom opposing surfaces;
  a peripheral side surface extending between the top and bottom surfaces;
  the top surface and peripheral side surface meeting at an upper edge, at least a portion of which comprises a cutting edge;
  the at least one cutting portion comprising a forward main cutting edge and two opposing side cutting edges extending rearwardly from the forward main cutting edge towards the clamping portion on opposing sides of a center line of the grooving insert; wherein:
  each side cutting edge has a serrated form in a top view of the grooving insert.

2. The grooving insert according to claim 1, wherein the serrated form comprises a plurality of steps, each step comprising three sections, a forward section, a rear section and a corner section therebetween,
  the rear section of one step merging with the forward section of an adjacent step, and
  the forward main cutting edge merging with a first step of the plurality of steps.

3. The grooving insert according to claim 2, wherein a first width of cut presented by the forward main cutting edge together with the adjacent forward sections of the first steps belonging to the two opposing side cutting edges, is at least five times a second width of cut presented by the forward section of either of the second steps.

4. The grooving insert according to claim 3, wherein the second width of cut is between 0.05 mm and 0.5 mm.

5. The grooving insert according to claim 2, wherein the forward section of the first step is rounded.

6. The grooving insert according to claim 5, wherein the rounded forward section is a circular arc of a given radius.

7. The grooving insert according to claim 2, wherein the steps of one side cutting edge are lined up with the steps of the other side cutting edge so that the upper edge has mirror symmetry about a plane passing through the center line, with the steps of the two opposing side cutting edges forming pairs of opposing steps relative to the center line.

8. The grooving insert according to claim 7, wherein the corner sections of a first of the two opposing side cutting edges lie on a first line and the corner sections of the second of the two opposing side cutting edges lie on a second line.

9. The grooving insert according to claim 8, wherein the first and second lines converge forwardly to the forward sections of the first step on either side of the forward main cutting edge.

10. The grooving insert according to claim 7, wherein the forward section of each step of a given pair of opposing steps, lies on a line of a pair of opposing lines that converge forwardly.

11. The grooving insert according to claim 10, wherein the rear section of each step of a given pair of opposing steps lies on a line of a pair of opposing lines that converge rearwardly.

12. The grooving insert according to claim 7, wherein the rear section of each step of a given pair of opposing steps lies on a line of a pair of opposing lines that converge rearwardly.

13. The grooving insert according to claim 1, wherein the peripheral side surface comprises at least one end surface and two opposing side surfaces extending rearwardly from the at least one end surface, the at least one end surface meeting the top surface at the forward main cutting edge of the at least one cutting portion.

14. The grooving insert according to claim 13, wherein each side surface is divided into two side surface portions, an upper side surface portion adjacent the upper edge and a lower side surface portion extending from the upper side surface portion to the bottom surface.

15. The grooving insert according to claim 14, wherein the shape of the upper side surface portion is similar to the shape of the upper edge in a top view of the grooving insert.

16. The grooving insert according to claim 1, comprising two cutting portions, one cutting portion located at either end of the grooving insert, along the center line, in a top view of the grooving insert.

17. A grooving insert comprising:
  a clamping portion and at least one cutting portion;
  top and bottom opposing surfaces;
  a peripheral side surface extending between the top and bottom surfaces;
  the top surface and peripheral side surface meeting at an upper edge, at least a portion of which comprises a cutting edge;

the at least one cutting portion comprising a forward main cutting edge and two opposing side cutting edges extending rearwardly from the forward main cutting edge towards the clamping portion on opposing sides of a center line of the grooving insert; wherein each side cutting edge comprises a plurality of steps;

each step, after the first step, has a forward section presenting a width of cut in a feed direction of the grooving insert; and no two of said forward sections lie on the same line, in a top view of the grooving insert.

18. A double-ended grooving insert comprising:

first and second cutting portions arranged at opposite ends of the grooving insert along a center line thereof;

each cutting portion comprising a forward main cutting edge and two opposing side cutting edges extending rearwardly from the forward main cutting edge on opposing sides of the center line; wherein each side cutting edge comprises a plurality of steps;

each step, after the first step, has a forward section presenting a width of cut in a feed direction of the grooving insert; and no two of said forward sections lie on the same line, in a top view of the grooving insert.

* * * * *